(12) United States Patent
Vinokour et al.

(10) Patent No.: US 8,543,488 B2
(45) Date of Patent: Sep. 24, 2013

(54) HIGH PERFORMANCE TRADING DATA INTERFACE AND TRADING DATA DISTRIBUTION PROTOCOL

(75) Inventors: Vitali Vinokour, Lexington, MA (US); Robert M. France, Carlisle, MA (US); Daniel Bergman, Brookline, MA (US); Raymond Chow, Waltham, MA (US); Chad L. Cook, Uxbridge, MA (US); Richard J. Lavoie, Waltham, MA (US); Scott McClure, Somerville, MA (US); Arian Joseph Radmand, Natick, MA (US); Rupert Webb, Norwood, MA (US)

(73) Assignee: Lime Brokerage LLC, Waltham, MA (US)

(*) Notice: Subject to any disclaimer, the term of this patent is extended or adjusted under 35 U.S.C. 154(b) by 90 days.

(21) Appl. No.: 13/087,906

(22) Filed: Apr. 15, 2011

(65) Prior Publication Data

US 2011/0196778 A1 Aug. 11, 2011

Related U.S. Application Data

(62) Division of application No. 12/982,317, filed on Dec. 30, 2010.

(60) Provisional application No. 61/295,389, filed on Jan. 15, 2010, provisional application No. 61/346,998, filed on May 21, 2010.

(51) Int. Cl.
*G06Q 40/00* (2012.01)

(52) U.S. Cl.
USPC .......................................................... 705/37

(58) Field of Classification Search
USPC .......................................................... 705/37
See application file for complete search history.

(56) References Cited

U.S. PATENT DOCUMENTS

| 5,497,317 A | 3/1996 | Hawkins et al. ............... 364/408 |
| 6,236,972 B1 | 5/2001 | Shkedy .............................. 705/1 |
| 6,418,419 B1 | 7/2002 | Nieboer et al. .................. 705/37 |

(Continued)

FOREIGN PATENT DOCUMENTS

WO        WO 00/77708      12/2000

OTHER PUBLICATIONS

Flynn, Clare, "AIMA: The Proof is in the Workflow", Beauchamp Financial Technology Ltd, 3 pages, 2006.

(Continued)

*Primary Examiner* — Jessica Lemieux
(74) *Attorney, Agent, or Firm* — Sunstein Kann Murphy & Timbers LLP

(57) ABSTRACT

A network enables monitors, trading platforms and libraries to share information about customers' trading activities and locally recalculate customer trading limits resulting from these trading activities. A low-latency interface between a customer server, such as a server that employs algorithmic trading methods to generate buy and sell orders for securities, and a brokerage server that validates such securities trading orders is optimized for handling the securities trading orders. The interface supports a trading command set specifically designed for orders from customer trading application programs, and the interface formats received trading commands into compact messages that are sent over a high-speed communication link to the brokerage server. The interface receives order acknowledgement messages and the like from the brokerage server and invokes callback routines in the customer trading application program to report status information.

6 Claims, 8 Drawing Sheets

(56) References Cited

U.S. PATENT DOCUMENTS

| | | |
|---|---|---|
| 7,299,208 B1 | 11/2007 | Bailon et al. .................. 705/37 |
| 7,305,483 B2 | 12/2007 | Yao et al. ...................... 709/231 |
| 2002/0184237 A1 | 12/2002 | McFeely .................... 707/104.1 |
| 2003/0009419 A1 | 1/2003 | Chavez et al. ................. 705/38 |
| 2003/0139990 A1 | 7/2003 | Greco ............................ 705/35 |
| 2005/0203825 A1 | 9/2005 | Angle et al. ................... 705/37 |
| 2005/0228743 A1 | 10/2005 | Warsaw et al. ................ 705/37 |
| 2007/0025351 A1 | 2/2007 | Cohen .......................... 370/390 |
| 2007/0100737 A1 | 5/2007 | Ginsberg et al. .............. 705/37 |
| 2007/0156568 A1* | 7/2007 | Jovanovic et al. ............. 705/37 |
| 2007/0198397 A1 | 8/2007 | McGinley et al. ............. 705/37 |
| 2008/0059846 A1 | 3/2008 | Rosenthal et al. ............ 714/100 |
| 2009/0063322 A1 | 3/2009 | Billingsley ...................... 705/37 |
| 2009/0077567 A1 | 3/2009 | Craddock et al. ............ 719/314 |
| 2009/0182656 A1 | 7/2009 | Tully et al. ..................... 705/35 |
| 2011/0178915 A1 | 7/2011 | Vinokour et al. .............. 705/37 |

OTHER PUBLICATIONS

Shipman, G.M., et al., "Infiniband Scalability in Open MPI", Proceedings 20<sup>th</sup> IEEE International Parallel & Distributed Processing Symposium, pp. 1-15, 2006.

Mehta, Nina, "Fast and Furious: Risk Management in a DMA Environment", Futures Industry Magazine, pp. 23, 26 and 27, Jul./Aug. 2006.

Geoffray, Patrick, "HPCwire: A Critique of RDMA", Myricom Inc., 6 pages, Aug. 18, 2006.

Hussain, Munira et al., "Using OpenFabrics InfiniBand for HPC Clusters", Dell Power Solutions, pp. 59-61, Nov. 2006.

Rudolph, Sarah, "Clearing the Deck: CME Planning to Offer Real-Time Data Feed for Risk Management", Futures Industry Magazine, p. 47, Sep./Oct. 2007.

"Trading Floor Architecture", Cisco Systems Inc., pp. 1-36, 2008.

Building a Low Latency Infrastructure for Electronic Trading a Sun Microsystems Blueprint, Sun Microsystems, Inc., pp. 1-30, 2009.

Mehta, Nina, "Sponsored Access Comes of Age", Traders Magazine Online News, 3 pages, Feb. 11, 2009.

Voltaire Messaging Accelerator, Achieve Lowest Latency for UDP Socket-Based Applications, 4 pages, Jun. 19, 2009.

Kittelsen, Doug, "The Future of High-Frequency Trading", Dealing with Technology, 3 pages, Sep. 21, 2009.

Hintze, John, "Sponsored Access: Should Trades Be Monitored Before They're Made?", Securities Industry News, 5 pages, Oct. 5, 2009.

Traer-Clark, Jonathan et al., "Progress-past, present and future", Lower Latency Trading, pp. 32-35, 2010.

International Searching Authority International Search Report and the Written Opinion for International Application No. PCT/US11/21370, 12 pages, May 26, 2011.

International Searching Authority International Search Report and the Written Opinion for International Application No. PCT/US2011/033335, 17 pages, Apr. 29, 2013.

\* cited by examiner

HIGH PERFORMANCE TRADING DATA INTERFACE AND TRADING DATA DISTRIBUTION PROTOCOL

CROSS REFERENCE TO RELATED APPLICATIONS

This application is a divisional of U.S. patent application Ser. No. 12/982,317, filed Dec. 30, 2010, titled "Trading Order Validation System and Method and High-Performance Trading Data Interface," which claims the benefit of U.S. Provisional Patent Application No. 61/295,389, filed Jan. 15, 2010, titled "Trading Order Validation System and Method," and U.S. Provisional Patent Application No. 61/346,998, filed May 21, 2010, titled "High-Performance Trading Data Interface," the entire contents of all of which are hereby incorporated by reference herein, for all purposes.

TECHNICAL FIELD

The present invention relates to computerized trading environments and more particularly to high-performance, low-latency interfaces between client trading platforms and broker trading servers.

BACKGROUND ART

"High-frequency" securities traders and commodities traders (collectively herein referred to as "traders") place and cancel many buy and sell orders (collectively "orders"), although some of the placed orders may never be filled. Essentially, the traders place a large number of orders with a goal of making gains, on the filled orders, more than sufficient to cover costs associated with both the filled and the unfilled orders.

Often, the orders are placed according to "algorithmic trading" methods, in which computer systems called "customer servers" monitor market prices, trading activity levels and other real-time data feeds and attempt to identify trades ("buy" or "sell" orders for particular securities, sometimes at particular prices, or cancellations or replacements of previously placed orders) that may be advantageous. The customer servers are often designed to allow traders to take advantage of very short lived market opportunities. Thus, very small latency times (typically measured in milliseconds or microseconds) between the identification of potentially profitable trades and the placement of the orders with exchanges are required, because the real-time data, upon which the trade decisions are made, change rapidly and have very short useful lifetimes.

Most traders are not, however, members of exchanges (also referred to as "venues"), such as the New York Stock Exchange ("NYSE") or NASDAQ. Consequently, these traders' customer servers cannot place orders directly with the exchanges. Instead, the customer servers are often coupled via computer network links to computer systems called "brokerage servers" operated by or sponsored by brokers who are members of the exchanges. The brokerage servers may multiplex orders from many customer servers and electronically forward the orders to electronic trading systems ("exchange servers") at the exchanges. A representative brokerage server is described in U.S. Pat. No. 5,864,827, the entire contents of which are hereby incorporated herein by reference.

Such "sponsored" access arrangements may forward orders without restriction, or the brokerage servers may validate the orders to ensure the traders do not violate rules or exceed predetermined limits and forward only orders that are successfully validated. Financial regulatory bodies, in conjunction with clearing brokers, often impose rules and regulations governing securities trading in various asset classes, such as U.S. Equities, options, futures and European Equities. In addition, client and brokerage risk departments may impose a number of restrictions. These restrictions, in aggregate, make up an order validation path within a brokerage server, which may include checks on: human error; open-order exposure; "long" and "short" sale validation; as well as on the aggregate dollar amount of "buy" orders a trader may have simultaneously outstanding, compared to the trader's "buying power."

Buying power means the amount of cash in the trader's brokerage account, plus an amount of "margin" (i.e., loan) that has been prearranged between the trader and the broker. Brokerage servers typically impose limits on orders placed by traders, such as to ensure the traders do not exceed their respective buying powers. For example, trades that would cause these limits to be exceeded are rejected by the brokerage servers. Brokers are motivated to enforce such rules and regulations, because the trades are made under the brokers' identifications with the exchanges. Consequently, if a limit is exceeded or a trading rule is broken, the broker may be sanctioned.

As noted, some prior art systems involve customer servers coupled via computer networks to brokerage servers which are, in turn, electronically coupled to electronic trading systems at exchanges, largely to reduce latency in placing the orders with the exchanges. However, many traders would prefer an arrangement that involves less latency. Removing the checks performed by the brokerage servers would reduce the latency. However, brokers are reluctant to transact such "naked" orders on behalf of their client traders, because of the risks of exceeding trading limits or violating other rules or regulations.

To speed up order processing and reduce latency, customer servers and brokerage servers typically include high-performance computer hardware. Nevertheless, communication between customer application programs executed by the customer servers on the one hand, and order validation and order routing software executed by the brokerage servers on the other hand, is often slower than desired.

SUMMARY OF THE INVENTION

An embodiment of the present invention provides a method of facilitating low-latency communication of trading orders from a customer server to a brokerage server. Trading orders are received, via a switched fabric communications facility, from a customer application running on the customer server. The trading orders have been formatted into commands of a dedicated trading command set for use over the facility. The received commands are directed to a brokerage application running on the brokerage server for processing by the brokerage server. The customer application communicates with the brokerage application over the facility without protocol processing by either an operating system of the customer server or an operating system of the brokerage server.

Flow of the commands of the dedicated trading command set may be controlled. The trading orders may be received according to a binary protocol. A compiled application programming interface (API) may be configured to be called directly by the customer application. The API may receive the trading orders from the customer application.

The dedicated trading command set may include a place order command, a cancel order command, a cancel and replace order command and a cancel all open orders command.

The "place order" command may include a fixed-length quantity field and a fixed-length price field, the contents of each of which are interpreted as a binary value and not a string value. The place order command may also include a fixed-length symbol field of a size less than a length of a longest symbol of a set of market symbols. If the fixed-length symbol field is too small to store a symbol associated with an order, an additional field may be appended to a command of the dedicated trading command set. The appended field may have a size sufficient to store the associated symbol. In response to receipt of at least one command of the dedicated trading command set, an indication of an aggregated buying power may be provided to the customer application.

If a parameter provided by the customer application is less than a predetermined length, the parameter may be stored in a fixed-length field of a command of the dedicated trading command set. If the parameter is greater than a predetermined length, the parameter may be stored in an optional field of the command of the dedicated trading command set.

In response to receipt of a command of the dedicated trading command set, at least one callback routine may be executed in a first execution thread, separate from a second execution thread of the customer application that generated the received trading orders. The first execution thread may be selectively executed by a first processor, different than a second processor that executes the second execution thread, based on a parameter passed by the customer application or based on a compile-time parameter.

Another embodiment of the present invention provides a low-latency communication interface. The communication interface may be used for communicating trading orders from a customer server to a brokerage server. The communication interface includes an application programming interface (API). The API is configured to be executed by the customer server. The API is also configured to receive trading orders from an application program being executed on the customer server and format the received trading orders into commands of a dedicated trading command set. The API is further configured to drive a first host channel adapter. The first host channel adapter is coupled via a switched fabric link to a second host channel adapter of the brokerage server. The API drives the first host channel adapter so as to direct the formatted trading commands, via the first and second host channel adapters and the switched fabric link, to a brokerage application program being executed on the brokerage server.

The customer server may define a user process context, and the application program may be executed within the user process context. The API may be further configured to be executed within the user process context to receive the trading orders. The API may be configured to drive the first host channel adapter from within the user process context, without operating system kernel mode protocol processing.

The dedicated trading command set comprises may include a place order command, a cancel order command, a cancel and replace order command and a cancel all open orders command. The API may be configured to provide an indication of an aggregated buying power to the customer application, in response to at least one command of the dedicated trading command set.

An embodiment of the present invention provides a system for post-trade monitoring of orders placed by a customer trading platform with at least one exchange server. The system includes a sponsored access post-trade monitor. The sponsored access post-trade monitor is distinct from the customer trading platform. For example, the sponsored access post-trade monitor and the customer trading platform may be separate computers. The sponsored access post-trade monitor is configured to receive drop copy messages from the at least one exchange server. The drop copy messages relate to respective orders placed by the customer trading platform. The sponsored access post-trade monitor is also configured to determine if one of the orders placed by the customer trading platform caused the customer to exceed a trading limit established for a customer. The determination is based at least in part on at least one of the received drop copy messages. If one of the orders is determined to have caused the customer to exceed the trading limit, the sponsored access post-trade monitor is configured to send a message, via a computer network, to the customer trading platform. The message instructs the customer trading platform to change to a less permissive trading mode. The system also includes an application programming interface (API) on the customer trading platform. The API is configured to receive messages from the sponsored access post-trade monitor. The API responds to the messages by altering a trading mode of the customer trading platform.

The application programming interface may be further configured to provide an indication of the trading mode of the customer trading platform or to provide an indication of permissibility of a proposed trade, according to the trading mode of the customer trading platform. In response to receiving a given message from the sponsored access post-trade monitor, the API may alter the trading mode of the customer trading platform. Possible modes include a mode enabling unrestricted trading, a mode enabling restricted trading and a mode disabling trading. In one embodiment, the modes include: a mode permitting orders that increase account exposure and permitting orders that decrease account exposure; a mode permitting orders that decrease account exposure and prohibiting orders that increase account exposure; and a mode prohibiting orders that increase account exposure and prohibiting orders that decrease account exposure.

The sponsored access post-trade monitor may be further configured to determine if the limit is no longer exceeded. The determination may be made based at least in part on at least one other of the received drop copy messages. If the limit is no longer exceeded, the sponsored access post-trade monitor may send a second message, via the computer network, to the customer trading platform. The message may instruct the customer trading platform to change to a less restrictive trading mode.

To facilitate sharing information about trading events and a customer's trading limit with other systems, the sponsored access post-trade monitor may also include a communication interface configured to communicate via a computer network. The sponsored access post-trade monitor may be configured to send information about trading events related to the customer trading platform via the communication interface. In addition, the sponsored access post-trade monitor may be configured to receive information about trading events related to at least one trading platform other than the customer trading platform, via the communication interface. Furthermore, the sponsored access post-trade monitor may be configured to recalculate the trading limit, based on the received information about the trading events.

Another embodiment of the present invention provides a computer-implemented method for post-trade monitoring of an order placed by a customer trading platform with at least one exchange server. An electronic drop copy message is received by a sponsored access post-trade monitor, which is distinct from the customer trading platform. The electronic drop copy message is received from the at least one exchange server. The electronic drop copy message relates to the order placed by the customer trading platform. A determination is made if the order placed by the customer trading platform caused the customer to exceed a trading limit established for a customer. The determination is made automatically, based at least in part on the received electronic drop copy message. If the order is determined to have caused the customer to exceed the trading limit, a message is automatically sent, via a computer network, to the customer trading platform. The message instructs the customer trading platform to change to a less permissive trading mode. The message from the sponsored access post-trade monitor is received at the customer trading platform. In response to the message, a trading mode of the customer trading platform is automatically altered.

Yet another embodiment of the present invention provides a system for pre-trade validation of proposed orders generated by a client application program. The client application program may be controlled by a customer and executed by a customer trading platform coupled to at least one exchange server. The system includes a communication interface within the customer trading platform. The communication interface is configured to receive at least one message containing information related to a trading limit for the customer. The message is received via a computer network. The system also includes a market interface configured for connection to the at least one exchange server. The connection may be via a computer network, either the same computer network over which the communication interface receives the message(s) containing information related to a trading limit for the customer or a different computer network. An order verification module is disposed within the customer trading platform. The verification module is coupled to the communication interface and to the market interface. The verification module is configured to receive the proposed orders from the client application program. In addition, the verification module is configured to determine if one of the received proposed orders would cause the customer to exceed the trading limit, if the order were placed with the at least one exchange. The determination may be based at least in part on the at least one message containing information related to a trading limit for the customer. If the trading limit would not be exceeded, the verification module sends the received proposed order, via the market interface, to the at least one exchange server.

The order verification module may be implemented to run in a common address space with the client application program on the customer trading platform. The order verification module and the market interface may be implemented to run in a common address space with the client application program on the customer trading platform. The order verification module may be implemented to run in a same process as the client application program on the customer trading platform.

If the trading limit would be exceeded, the order verification module may be further configured to reject the proposed order. Optionally or alternatively, the order verification module may be further configured to enter a trading mode in which the verification module permits orders that decrease account exposure and prohibits orders that increase account exposure. In one embodiment, after a buying power of the customer exceeds a predetermined limit, the order verification module is further configured to enter a trading mode, in which the verification module permits orders that increase account exposure. Optionally or alternatively, after at least a calculated aggregate value of sell orders have been filled, the order verification module may be further configured to enter a trading mode, in which the verification module permits orders that increase account exposure. Optionally or alternatively, if the trading limit would be exceeded, the order verification module may be further configured to enter a trading mode, in which the verification module prohibits orders that increase account exposure and prohibits orders that decrease account exposure. Optionally or alternatively, after a buying power of the customer exceeds a predetermined limit, the order verification module may be further configured to enter a trading mode, in which the verification module permits orders that increase account exposure and permits orders that decrease account exposure. Optionally or alternatively, after at least a calculated aggregate value of sell orders have been filled, the order verification module may be further configured to enter a trading mode, in which the verification module permits orders that increase account exposure and permits orders that decrease account exposure.

In one embodiment, the order verification module is further configured to dynamically alter a trading mode of the customer trading platform among: a mode enabling unrestricted trading, a mode enabling restricted trading and a mode disabling trading. A transition of the mode of the customer trading platform may be based at least on the proposed orders received from the client application program and the information related to the trading limit for the customer.

The order verification module may be further configured to dynamically alter a trading mode of the customer trading platform among: (a) a mode permitting orders that increase account exposure and permitting orders that decrease account exposure, (b) a mode permitting orders that decrease account exposure and prohibiting orders that increase account exposure and (c) a mode prohibiting orders that increase account exposure and prohibiting orders that decrease account exposure. A transition of the mode of the customer trading platform may be based at least on the proposed orders received from the client application program and the information related to the trading limit for the customer.

The order verification module may be further configured to recalculate the trading limit, based on at least some of the proposed orders received from the client application program.

To facilitate sharing information about trading events and a customer's trading limit with other systems, the customer trading platform may include a second communication interface configured to communicate via a computer network. The second communication interface may be coupled to the order verification module. The order verification module may be further configured to send information about trading events related to the customer trading platform, via the second communication interface. In addition, the order verification module may be configured to receive information about trading events related to at least one trading platform other than the customer trading platform, via the second communication interface. Based on the received information about the trading events, the order verification module may be configured to recalculate the trading limit.

A broker control system may be coupled via the computer network to the communication interface. The broker control system may be configured to send the at least one message containing information related to the trading limit for the customer. Optionally, the broker control system may also be coupled to at least one trading platform, other than the customer trading platform. In this case, the broker control system may be configured to send information related to the trading limit for the customer to each of the at least one trading platform. Optionally, the broker control system may be coupled to at least one post-trade monitor server and configured to send information related to the trading limit for the customer to each of the at least one post-trade monitor server.

An embodiment of the present invention provides a computer-implemented method for pre-trade validation of a proposed order generated by a client application program controlled by a customer and executed by a customer trading platform coupled to at least one exchange server. At least one message containing information related to a trading limit for the customer is received, via a computer network. A proposed order is received from the client application program. Within the customer trading platform, it is automatically determined if the proposed order would cause the customer to exceed the trading limit, if the order were placed with the at least one exchange. The determination may be based at least in part on the information related to the trading limit for the customer. If the trading limit would not be exceeded, the proposed order may be automatically sent to the at least one exchange server.

If the trading limit would be exceeded, a trading mode may be entered, in which orders that decrease account exposure are permitted and orders that increase account exposure are prohibited.

A trading mode of the customer trading platform may be dynamically altered among: a mode enabling unrestricted trading, a mode enabling restricted trading and a mode disabling trading. The mode of the customer trading platform may be based at least on the proposed orders received from the client application program and the information related to the trading limit for the customer.

Optionally, the trading limit may be recalculated, based on at least some proposed orders received from the client application program.

Another embodiment of the present invention provides a brokered access trading server for pre-trade validation of proposed orders generated on behalf of a customer by a customer trading platform for placement with at least one exchange server. The server may be implemented as a computer system that includes a communication interface configured to communicate via a computer network. The computer system may be configured to receive the proposed orders from the customer trading platform and determine if one of the received proposed orders would cause the customer to exceed a trading limit, if the order were to be placed with the at least one exchange. If the trading limit would not be exceeded, the computer system may send the received proposed order to the at least one exchange server. In addition, the computer system may send information about trading events related to the customer trading platform, via the communication interface. Furthermore, the computer system may receive, via the communication interface, information about trading events related to at least one trading platform other than the customer trading platform. As a result, the computer system may recalculate the trading limit, based on the received information about the trading events.

Yet another embodiment of the present invention provides a computer-implemented method for pre-trade validation of a proposed order generated on behalf of a customer by a customer trading platform for placement with at least one exchange server. The proposed order is received from the customer trading platform. It is automatically determined if the received proposed order would, if placed with the at least one exchange, cause the customer to exceed a trading limit. If the trading limit would not be exceeded, the proposed order is automatically sent to the at least one exchange server. In addition, information about trading events related to the customer trading platform is automatically sent, via a computer network, and information about trading events related to at least one trading platform other than the customer trading platform is received. The trading limit may be automatically recalculated, based on the received information about the trading events.

Yet another embodiment of the present invention provides a system for validation of proposed orders generated on behalf of a customer by a plurality of customer trading platforms for placement with at least one exchange server. The system includes a computer network interconnecting at least two servers. Each server is at least one of: a pre-trade validating brokered access trading server, a post-trade order monitor and a self pre-trade validating customer trading platform. Each server includes a communication interface configured to communicate via the computer network. In addition, each server is configured to determine if an order would cause the customer to exceed a trading limit established for the customer. In addition, each server is configured to send information about trading events related to the server, via the communication interface, and to receive, via the communication interface, information about trading events related to the other of the at least two servers. Each server is configured to recalculate the trading limit, based on the received information about the trading events.

An embodiment of the present invention provides an improved system for validation of orders from a customer trade server to a set of exchange servers. The system is of the type including: (i) an order data base, on the customer trade server, that stores order and trade data of a customer being processed through the customer trade server, (ii) a broker order data base that stores order and trade data of the customer trade server made under authority of a broker and is used for pre-trade order validation purposes, and (iii) an interface between the customer trade server and the set of exchange servers for translating customer orders originating from an order output in the customer trade server into a standard protocol. The improvement includes a single order data base coupled to the order output. The single order database stores order and trade data of the customer being processed through the customer trade server. The single order database is resident on the customer trade server. In addition, an order validation module, operating under supervision of the broker, is resident on the customer trade server. The order validation module is coupled to the single order database. The order validation module polices compliance of orders stored in the order database with trading parameters governing trading activity by the customer. A market interface is resident on the customer trade server. The market interface is coupled to the single order database and operates under supervision of the broker. The market interface translates orders of the customer into a standard protocol and communicates them to the set of exchange servers, so that the single order database is used by the customer trade server in storing order and trade information of the customer while also being used for pre-trade order validation purposes by components under supervision of the broker.

The order validation module may be coupled over a network to a sponsored access management module of a broker-operated server.

The order validation module, the market interface and the order output may be implemented to run in a common address space on the customer trade server. The order validation module, the market interface and the order output may be implemented as a single process.

The single order data base may be included in a single trading data base also resident on the customer trade server.

Another embodiment of the present invention provides a system for post-trade validation of orders from a customer trading server to at least one exchange server. The system includes a communication path to an application programming interface of a customer trading server. The communication path may be used for sending control messages that control a trading mode of the customer trading server. A sponsored access trading monitor may be coupled over the communication path to the application programming interface. The sponsored access trading monitor may also be coupled, via a computer network, to at least one exchange server to which the customer trading server has transmitted at least one order. The trading monitor: (i) receives drop copy messages relating to the at least one order from the at least one exchange; (ii) validates the at least one order; and (iii) responsive to a configured limit established for the customer, issues a control message over the communication path when required that can be used to control the trading mode of the customer trading server.

Yet another embodiment of the present invention provides a method for managing risk associated with trading of a customer utilizing a plurality of trading servers. A communication path to each of the trading servers is used to send trading event messages to provide each server with updated trading event information from all of the other trading servers. At each of the trading servers, the updated trading event information is aggregated in processes including at least one of assessing compliance and managing risk with configured trading limits of the customer.

A post-trade monitor receives feedback in the form of drop copy messages from an exchange server and validates orders placed with the exchange server by a sponsored access trading platform shortly after the orders have been placed. If a recently placed order is found to violate a rule or regulation, the monitor instructs the trading platform to change to a more restrictive trading mode, such as to cease placing all orders or certain types of orders, at least until certain parameters are met. A library provides an interface in a sponsored access trading platform between a client application program that generates proposed orders and an exchange server. The library provides pre-trade validation of the orders and sends only validated orders to the exchange server.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
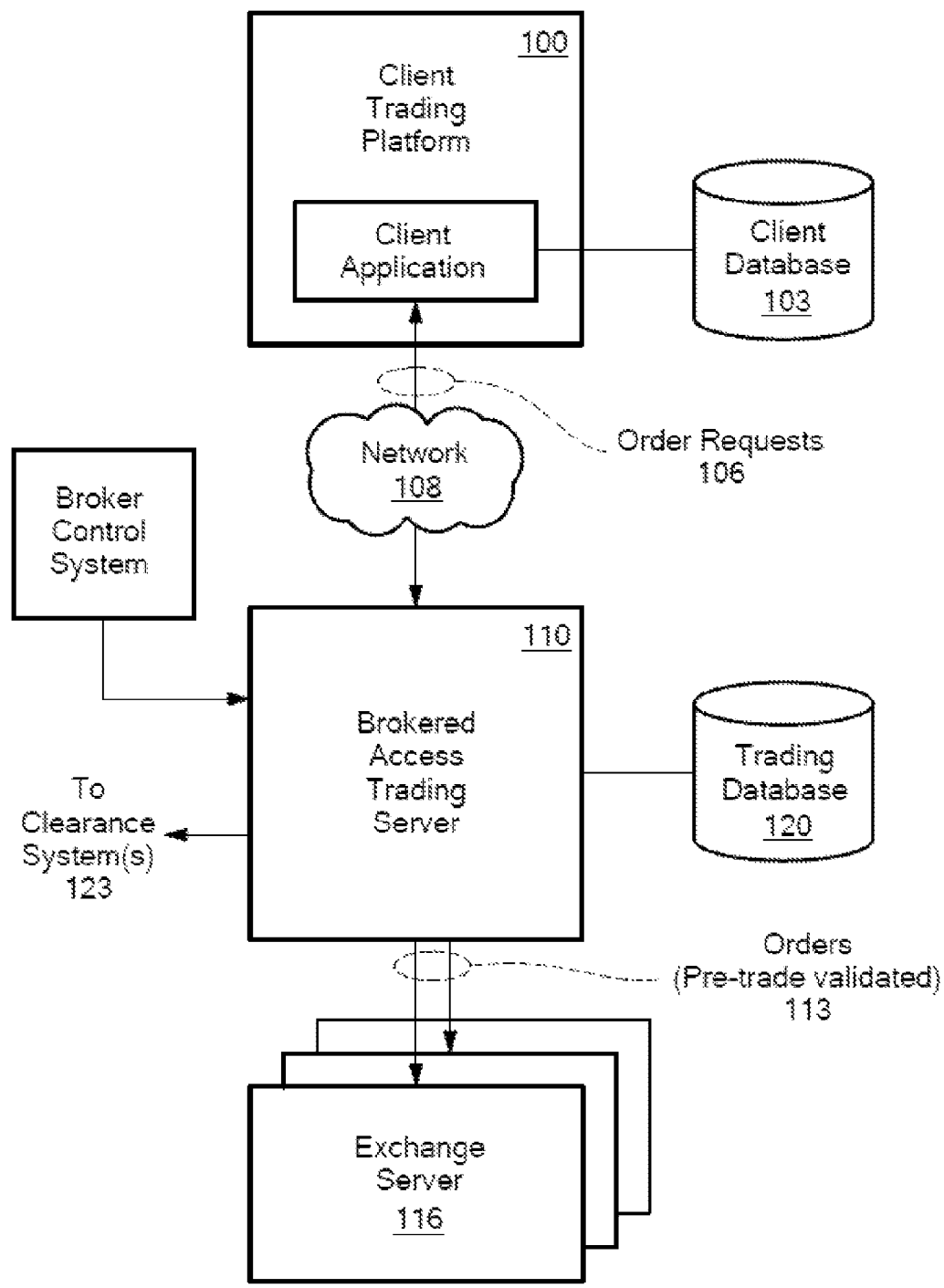
FIG. 1 is a schematic block diagram of a pre-trade validated brokered access securities trading system, according to the prior art.

As used in this description and in the accompanying claims, the following terms shall have the meanings indicated, unless the context otherwise requires.

Order—an offer to buy or sell a specified security, sometimes at a specified price. An order may be cancelled or replaced with a different order. Securities are often identified by "symbols," such as "MSFT" for Microsoft Corporation.

Open order—an order that has been placed with an exchange, but that has not yet been filled. An order may be filled over time in several parts. For example, an order to buy 1,000 shares of a particular security may result in a purchase of 250 shares of the security, and then later a purchase of an additional 750 shares. Thus, between the two purchases, the order is partially filled.

Trading events—messages or information about events related to orders, in which the events alter a customer's buying power or another limit used to validate orders. Examples include: orders, executions and administrative adjustments of an account, such as: an order being filled or partially filled, an order being cancelled and an order being modified.

Locates—sources of securities available for borrowing in support of short selling. Rules designed to ensure short sellers meet their settlement obligations require affirmative determinations, before the securities are sold short, that the short-sold securities will be delivered or borrowed by settlement date. "Blanket" assurances (commonly referred to as "easy to borrow lists") may be used for some securities. However, other securities (those on a so-called "hard to borrow list") are considered difficult or unavailable to borrow for short selling transactions. Brokerages and investors must take extra measures, before short selling such hard to borrow securities, to ensure their availability.

Position—a set of securities owned by a trader, including prices paid for the securities (note that identical securities may have been purchased at different times for different prices); may also include dates on which the securities were bought; in some contexts, such as when calculating the trader's buying power, may also include current market values of the owned securities.

Buying power—an amount of cash in a customer's brokerage account, plus an amount of "margin" (i.e., loan) that has been prearranged between a broker and the customer; an amount that is available for buying securities, as calculated according to a set of rules. A broker may wish to prevent a customer from placing "buy" orders that, collectively, exceed the customer's buying power. Buying power can vary during a trading day. For example, if a customer issues a "buy" order, the customer's buying power may be reduced by the expected cost of the purchase. Securities' prices can vary during a trading day, so the buying power may need to be recalculated intraday, based on changes in securities' prices. If a customer sells a portion of his/her position, profit from that sale may be added to the customer's buying power. However, a history of purchase prices may be necessary to accurately calculate the profit from a given sale, because the customer's position may include securities of a given symbol that were purchased at different times and for different prices.

FIG. 1 is a schematic block diagram of a prior art securities trading system in which orders are validated by a broker's trading server, before the orders are placed with an exchange. This arrangement is commonly referred to as providing "pre-trade validation." A customer server (also referred to as a "client trading platform") 100 is coupled to a client database 103. The client trading platform 100 typically receives real-time data though an interface (not shown) about market activity. For example, a quote data feed from the market may provide near real-time information about recent trades and other activities, such as prices and symbols for traded securities, buy and sell offers, etc. The client trading platform 100 may store some or all of this data in the client database 103 and use this data, along with algorithms and parameters provided by trading analysts, to generate requests 106 to buy and sell securities.

These requests 106 are sent via a computer network 108 to a brokerage server (also referred to as a "brokered access trading server") 110. The client trading platform 100 may be remote from, or co-located with, the brokered access trading server 110. Thus, the computer network 108 may be a wide area network (WAN) or a local area network (LAN).

Ideally, the brokered access trading server 110 is configured to validate order requests received from the client trading platform 100. That is, ideally, the brokered access trading server 110 checks whether each order request would cause a client to exceed the client's trading limit (such as the client's buying power) or otherwise violate a rule or regulation. To facilitate validating orders, the brokered access trading server 110 maintains a trading database 120, which stores information about individual traders' buying powers, such as the traders' positions, locates, etc.

If the order request would not cause a rule or regulation violation, the brokered access trading server 110 generates an order and sends the order 113 via a computer network (not shown) to an exchange server 116. (The brokered access trading server 110 may be connected to several exchange servers 116, such as exchange servers 116 associated with various markets, such as the New York Stock Exchange ("NYSE") and NASDAQ.) The brokered access trading server 110 also stores information about the order in the trading database 120. As noted, the above-mentioned trading validations use information included in the trading database 120. In practice, in prior art systems, there may be some difficulty in implementing the brokered access trading server 110 to police all parameters governing trading activities of a client on an order-by-order basis; indeed, some parameters are not easy to evaluate on an order-by-order basis.

The exchange server 116 sends status information back to the brokered access trading server 110 to indicate whether the order 113 is filled by the exchange or not. In some cases, the client trading platform 100 sends an order request 106 to cancel or modify a previously placed order. In these cases, the brokered access trading server 110 sends a cancellation or modification order 113 to the exchange server 116.

The brokered access trading server 110 informs the client trading platform 100 of the status of orders, as well as updating the information in the trading database 120. The client trading platform 100 may update the client database 103 with the status information about the orders. At the end of a trading day, data may be sent to a clearance system 123, which reconciles all orders and trades according to the net result of the day's trading and generates invoices to reflect the reconciliation. Some brokers perform their own clearing, while other brokers use banks or other institutions to perform clearance work for the brokers.

Systems, such as the one shown in FIG. 1, are in current use. However, some traders disfavor such systems, because of the latencies introduced by, among other things, the network connection between the client trading platform 100 and the brokered access trading server 110 and the network connection between the brokered access trading server 110 and the exchange server 116. To reduce these latencies, in some cases the client trading platform 110 is co-located with the brokered access trading server 110. In some cases, the brokered access trading server 110 is co-located with the exchange server 116. Nevertheless, some traders find the resulting latencies undesirably high.

Non-Intrusive Post-Trade Validation Monitor

Figure 2:
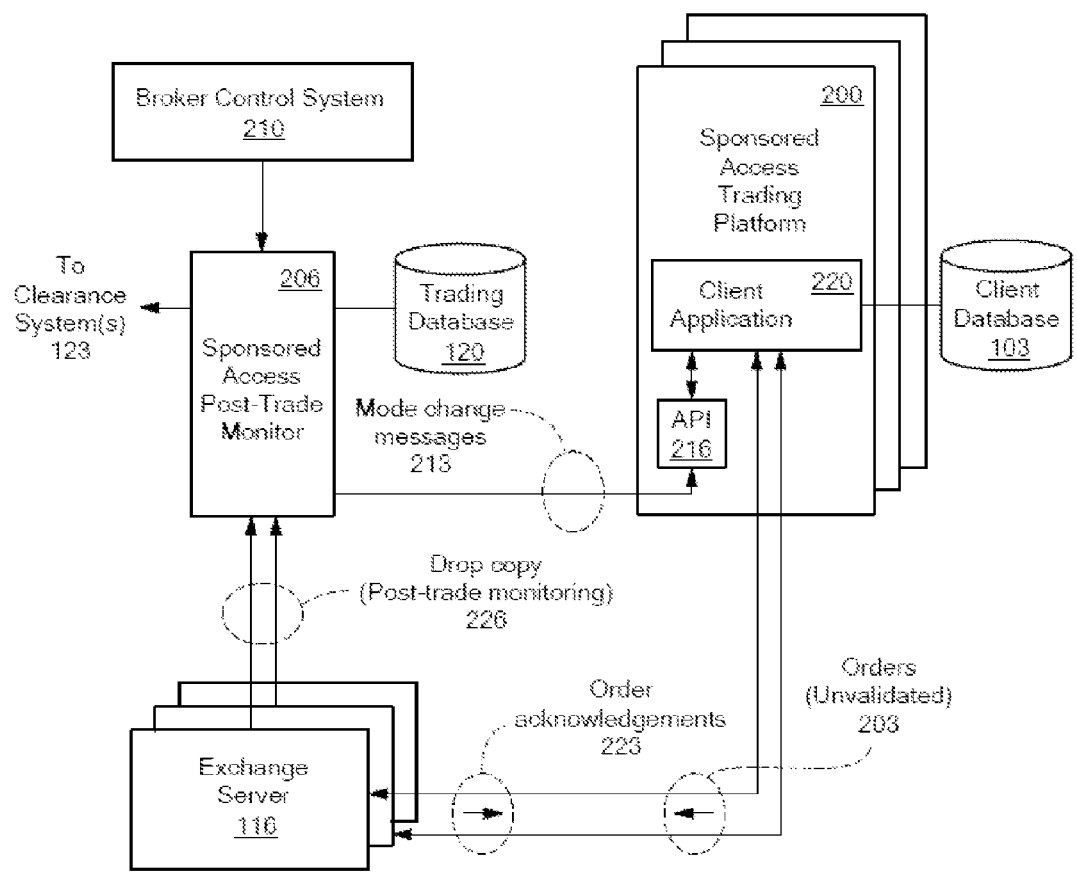
FIG. 2 is a schematic block diagram of a non-intrusive, post-trade validated sponsored access securities trading system, according to an embodiment of the present invention.

To address traders' concerns over latencies of prior art systems, an embodiment of the present invention provides a sponsored access arrangement, as exemplified schematically in FIG. 2, under which a trading server (here called a "sponsored access trading platform 200") of a customer of a broker (also called a "client" of the broker) communicates directly with an exchange server 116 under authority of the broker, but without the direct pre-trade validation provided by arrangements such as those described in connection with FIG. 1. Instead, the sponsored access trading platform 200 operates in one of several modes, which define whether the platform 200 may issue orders 203 and, if so, the types of orders 203 that may be issued.

A sponsored access post-trade monitor 206 monitors feedback, in the form of drop copy messages 226, from the exchange server 116, to validate orders 203 shortly after the orders 203 have been placed by the sponsored access trading platform 200 with the exchange server 116. If a recently placed order 203 is found to have caused a rule or regulation violation, the sponsored access post-trade monitor 206 instructs the sponsored access trading platform 200 to change to a more restrictive mode, such as to cease placing all orders or certain types of orders, at least until certain parameters are met.

For example, the sponsored access trading platform 200 may be placed in a mode that permits placing only orders that would decrease a customer's account exposure until a required minimum level of buying power is restored. In the case of U.S. Equities, long sales, i.e., sales of securities that are owned by the customer, would decrease account exposure. On the other hand, if a customer held a short position, i.e., if the customer placed a "sell" order for a security the customer did not own, then buying the security would decrease the customer's account exposure. Options may present more complex examples.

This sponsored access arrangement is called "non-intrusive post-trade validation." One sponsored access post-trade monitor 206 may monitor feedback resulting from orders placed by several sponsored access trading platforms 200, such as platforms 200 operated by different customers, platforms 200 connected to different exchanges and/or instances where multiple platforms 200 are required or desired to handle expected trade volumes.

In this embodiment, at the beginning of a trading day, a broker control system 210 determines trading limits for each sponsored customer, according to the customer's buying power, etc., and sends these limits, together with additional information (described below) to the sponsored access post-trade monitor 206, which maintains a trading database 120, as described above. When the sponsored access post-trade monitor 206 is ready to begin validating orders, the post-trade monitor 206 sends a state change message 213 to the sponsored access trading platform 200 to enable trading. The current mode of the sponsored access trading platform 200 is stored by an application programming interface (API) 216. The broker may provide the API 216 to the customer for inclusion in the sponsored access trading platform 200. In one embodiment, the modes include "Trading Disabled," "Unrestricted Trading Enabled" and "Restricted Trading Enabled." In another embodiment, unrestricted trading permits orders that would increase account exposure and orders that would decrease account exposure, while restricted trading permits only orders that would decrease account exposure.

A client application program 220, typically provided by the customer, executes under control of the customer on the sponsored access trading platform 200. The client application program 220 may receive quote data feeds and/or other data streams (not shown), and the client application program 220 may maintain a client database 103 of this and other information used to inform algorithmic trade generation. The client application program 220 thus generates proposed orders for trades, as described above.

However, for each proposed trade, the client application program 220 calls the API 216 to ensure the proposed trade is permitted, according to the current mode of the sponsored access trading platform 200. If trading is unrestricted, or if the proposed order is permitted under a current restricted trading mode, the API 210 so indicates to the client application program 220, and the client application program 220 sends an order 203 directly to the exchange server 116. Alternatively, the API 216 merely reports the current trading mode to the client application program 220, and the program 220 determines whether the proposed order is permitted under the current mode. If a proposed order is not permitted under the current mode, the client application program 220 should not send the order to the exchange server 116. However, the API 216 has no mechanism to enforce the current trading mode.

The sponsored access trading platform 200 generates the orders 203 under the identification of the broker. Thus, the orders 203 appear to the exchange as having been issued by the broker. Optionally, the sponsored access trading platform 206 may be connected to more than one exchange server 116, such as multiple servers in a single market or to individual servers in several respective markets. In this case, the API 216 may maintain a separate trading mode for each of the exchange servers 116.

Order acknowledgements 223 (such as "order received," "order filled," "order cancelled," "order cancelled and replaced," etc.) are sent by the exchange server 116 back to the client application program 220. The exchange server 116 generates "drop copy" messages 226, which are essentially copies of the acknowledgement messages 223 sent by the exchange server 116 to the sponsored access trading platform 200. The sponsored access post-trade monitor 206 operated by the broker receives the drop copy messages 226 and validates the orders 203, as described above with respect to FIG. 1, except each validation occurs after the corresponding order 203 has been placed with the exchange 116.

The sponsored access post-trade monitor 206 does not receive copies of the orders 203 sent by the sponsored access trading platform 200 to the exchange server 116. However, this order information may be useful or necessary to perform order validation. In addition, this order information may be useful or necessary to the broker, such as for end-of-day reconciliation. The drop copy messages 226 allow the sponsored access post-trade monitor 206 to infer order information for validating the orders 203 sent by the sponsored access trading platform 200, such as by checking whether the customer has exceeded its buying power or violated a long sale and short sale rule or exceeded a limit, in a manner similar to that used by the brokered access trading server 110 (FIG. 1) described above. The customer's buying power and other limits may be recalculated by the sponsored access post-trade monitor 206 as orders are placed and filled. For example, as "buy" orders are placed with the exchange server 116, the customer's buying power may be correspondingly reduced, and as "sell" orders are filled, the customer's buying power may be correspondingly increased.

If the sponsored access post-trade monitor 206 detects a violation of a rule or a limit that has been exceeded, the sponsored access post-trade monitor 206 sends a mode change command message 213 to the API 216, thereby changing the sponsored access trading platform 200 to a more restrictive trading mode, i.e., to disable further trading or to allow only certain types of trading until the limit or rule is no longer violated. For example, if the order 203 that violated the limit caused the customer to exceed his/her buying power, the mode change command message 213 may cause the API 216 to allow only long "sell" orders (which, when filled, increase the customer's buying power) until the customer's buying power exceeds the customer's open orders. Depending on the rule or limit that was violated or exceeded, the state change command message 213 may indicate all trading by the sponsored access trading platform 206 should be terminated or suspended, or only certain types of trading should be terminated or suspended.

The client application program 220 may be required to acknowledge receipt of all mode change messages 213. For example, a contractual relationship between the broker and the customer may require such acknowledgements be sent within a specified amount of time to the sponsored access post-trade monitor, and failure to timely acknowledge receipt of a mode change message 213 may be deemed a breach of the contract. The receipts may be sent via the same network connection as the mode change messages 213.

An exchange server 116 may include an executive port (not shown), by which the sponsored access post-trade monitor 206 may instruct the exchange server 116 to cease accepting orders from the sponsored access trading platform 200 and possibly modify or cancel one or more open orders. If so, and if the required acknowledgement is not timely received, the sponsored access post-trade monitor 206 may optionally send a message to the exchange server 116 requesting that the exchange server 116 cease accepting orders from the sponsored access trading platform 200. Optionally, the sponsored access post-trade monitor 206 may instruct the exchange server 116 to execute, modify or cancel an order on behalf of the client.

Depending on the limit or rule that was exceeded or violated, trading or unlimited trading may not be permitted to resume until a safety margin, relative to the rule or limit, is obtained. For example, "buy" orders may not be permitted until the customer's buying power is restored to a predetermined level above its minimum buying power requirement, or that a calculated minimum dollar value of securities be sold, to reduce the likelihood that the next permitted "buy" order will again place the customer above its buying power limit. Once the sponsored access post-trade monitor 206 determines that the customer may resume trading or may resume unlimited trading, the sponsored access post-trade monitor 206 sends an appropriate mode change message 213 to the sponsored access trade platform 200.

The non-intrusive post-trade validated sponsored access arrangement, exemplified by the system of FIG. 2, typically exhibits less latency than the brokered access arrangement, exemplified by the system of FIG. 1, because traffic through the broker's trading server (i.e., the brokered access trading server 110 of FIG. 1) is eliminated. Furthermore, processing delays associated with network communication protocols resulting from communications between the client trading platform 100 (FIG. 1) and the brokered access trading server 110 (FIG. 1) are avoided. However, in the system of FIG. 2, the broker takes a greater risk in operating a post-trade validated sponsored access arrangement, because orders are monitored directly by systems operated by the broker only after the orders 203 have been placed with the exchanges 116. Thus, it is easier for a trader or an errant client application program 220 to violate a rule or exceed a limit and continue trading using this post-trade validated sponsored access arrangement than using a pre-trade validated brokered access arrangement, as in FIG. 1.

Pre-Trade Validation Embedded Library

Figure 3:
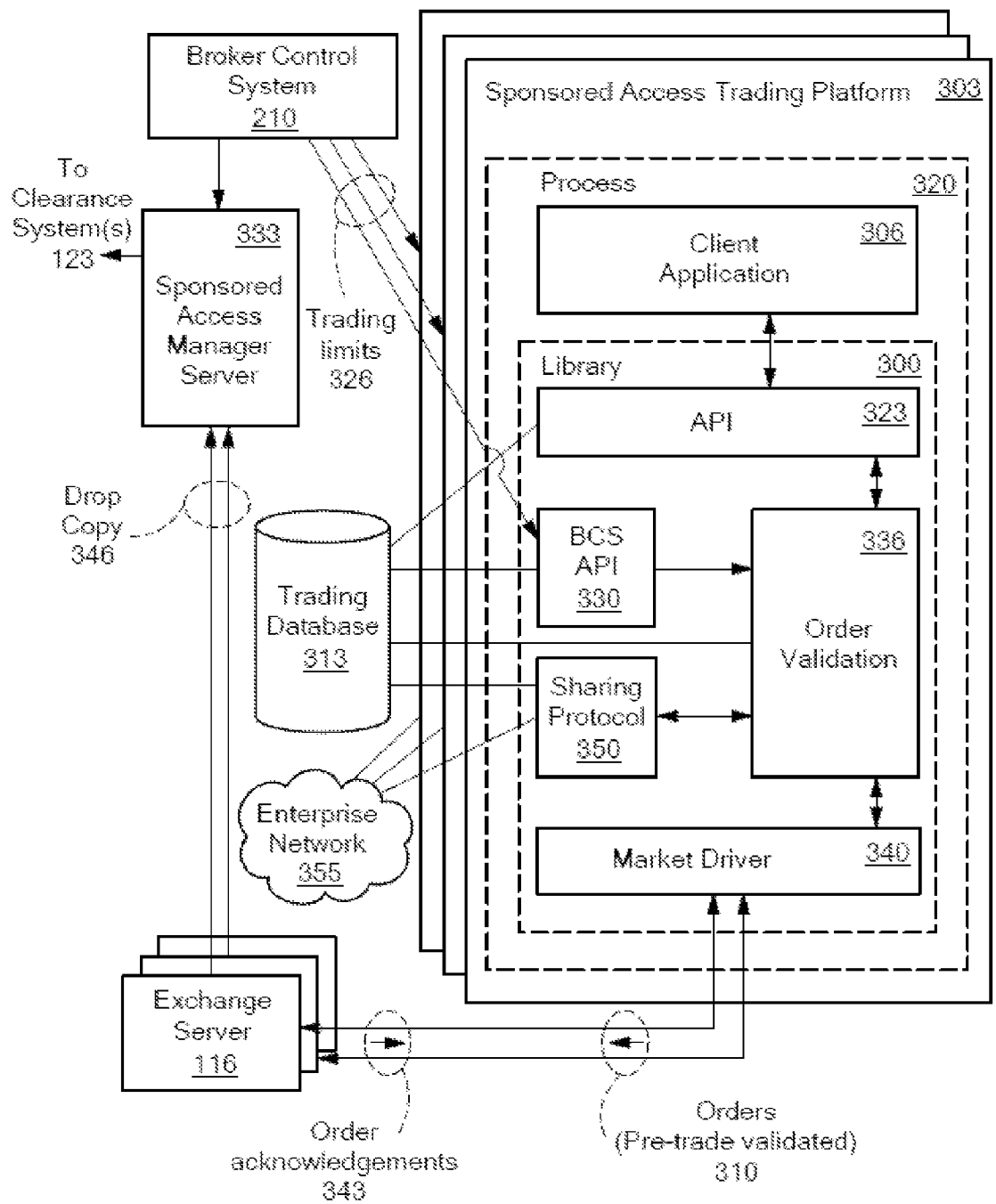
FIG. 3 is a schematic block diagram of a pre-trade validated sponsored access securities trading system according to another embodiment of the present invention.

FIG. 3 schematically illustrates another embodiment of the present invention, which more actively monitors sponsored access trading, while still avoiding latencies associated with utilization of a separate trading server operated by the broker. This embodiment, referred to as an "embedded pre-trade validation library arrangement," provides a callable library 300, operated under supervision of the broker but implemented on the customer's sponsored access trading platform 303. The broker typically provides the library 300 to the customer. The library 300 provides an interface between a client application program 306 and the exchange server 116. That is, the client application program 306 calls the library 300 to place proposed orders. Because the library 300 is interposed between the client application program 306 and the exchange server 116, the library 300 is able to validate all proposed orders and send only validated orders 310 to the exchange server 116. The library 300 rejects orders that would cause a rule to be violated or a limit to be exceeded. The library may also provide other services to the client application program 306. For example, the library 300 maintains a trading database 313 with information about open orders, positions, etc., used to validate proposed orders. The library 300 may provide access to some or all of this information to the client application program 306, such as to satisfy requests for this information by the trading algorithms employed by the client application program 306.

Such a system exhibits much less latency than the pre-trade validation brokered access arrangement shown in FIG. 1, while providing pre-trade validation of orders that is absent from the non-intrusive post-trade validation sponsored access arrangement described above, with respect to FIG. 2. Furthermore, the proposed orders are validated using a trading database, resident on the client's sponsored access trading platform 303, which may be shared with the client application program 306.

The client's sponsored access trading platform 303 provides an execution environment for a process 320, within which the client application program 306 and the library 300 execute. The library preferably includes an API 323, by which the client application program 306 may invoke routines that provide services of the library 300. The library 300 preferably shares an address space with the client application program 306. Consequently, control and data may be passed more quickly between the client application program 306 and the library 300 than by using interprocess or network communication techniques.

In this embodiment, at the beginning of a trading day, a broker control system (BCS) 210 determines trading limits for each sponsored customer, according to the customer's buying power, etc., and sends this information to a sponsored access manager server 333. The broker control system 210 also sends this information 326 to the library 300 via a BCS API 330. The BCS API stores the trading limit information.

The client application program 306 executes under control of the client (i.e., the customer of the broker) on the sponsored access trading platform 303. The client application program 306 may receive quote data feeds and/or other data streams (not shown), and the client application program 306 may maintain a database (not shown) of this and other information used to inform algorithmic trade generation. However, because the trading database 313 includes much or all the data the trading algorithms require, the client application program 306 may be relieved from gathering and maintaining its own data, as well as managing a database. The client application program 306 thus generates proposed orders for trades, as described above.

As noted, for each proposed order, the client application program 306 calls the library 300, and an order verification module 336 within the library 300 tests the proposed order against the customer's trading limits. The order verification module 336 maintains information about open orders, positions, locates, etc, so the order verification module 336 can recalculate the customer's account exposure, buying power and other trading limits (collectively referred to as a "trading limit") whenever necessary during the trading day. The order verification module 336 uses the trading limit parameters and other information 326 sent at the beginning of the trading day, recalculated intraday as needed, together with other data in the trading database 313 to validate the proposed order.

If a given proposed order satisfies the rules and limits, the order verification module 336 invokes a market driver 340 to send an order 310 directly to the exchange server 116. Order acknowledgements 343 are sent by the exchange server 116, as previously discussed. The order verification module 336 updates the trading database 313 as needed, such as when orders are filled. The exchange server 116 sends drop copy messages 346 to the sponsored access manager server 333, which stores information about filled orders and handles end-of-day clearance. As with the embodiment described above with respect to FIG. 2, the sponsored access trading platform 303 may be connected to plural exchange servers 116.

On the other hand, if a proposed order does not satisfy the rules and limits, the order verification module 336 so reports to the client application program 306. In this case, the client application program 306 can not send the proposed order to the exchange server 116, because the library 300 provides the only interface between the sponsored access trading platform 303 and the exchange server 116. In addition, the order verification module 336 may change the state of the sponsored access trading platform 303 to disable further trading, or to allow only certain types of trading, until the limit or rule is no longer violated, as discussed above with respect to FIG. 2.

Thus, the library 300 reads from, and writes to, the trading database 313 and provides access to information in the trading database 313 to the order verification module 336 and to the client application program 306. As noted, the client application program 306 may use information in the trading database 313, such as information about the customer's current positions, such as relative to certain securities, to generate proposed orders. The client application program 306 selects trades to be made, as described above, except that the client application 306 is relieved, by the library 300, from managing details of accessing the trading database 313. Instead, the client application program 306 may invoke the library 300 to perform database access operations, such as queries, reads and writes.

In contrast with the sponsored access arrangement of FIG. 2, the client application program 306 (FIG. 3) need not include an interface to the exchange server 116, inasmuch as the library 300 includes such an interface. Furthermore, the orders 310 are validated before the library 300 sends the orders to the exchange server 116, unlike the post-trade validated sponsored access arrangement of FIG. 2. Thus, the sponsoring broker is more protected against errant trading.

Information Sharing

A customer may prefer or require multiple sponsored access trading platforms 303, such as to handle a high volume of trades or to co-locate each trading platform 303 with a corresponding exchange server 116. The exchange servers 116 may be located in geographically dispersed cities. However, the multiple sponsored access trading platforms 303 may need to share information to enable the order verification modules 336 to validate proposed orders. For example, the customer's buying power may be shared by all of the customer's sponsored access trading platforms 303. To facilitate such sharing, the library 300 may include a sharing protocol module 350, which enables the order verification module 336 to communicate via a computer network 355 with order verification modules 336 in other sponsored access trading platforms 303.

In one embodiment, each order validation module 336 originates messages (which may be multicast or unicast messages) containing information to the other order validation modules 336 as the statuses of orders become available to the order validation module 336. These messages are referred to as "trading event updates." This activity may be driven by receipt of the order acknowledgements 343. For example, each order validation module 336 may multicast information about order fills or partial fills, order cancellations, order modifications and administrative adjustments to an account, as these events occur. Essentially, each order validation module 336 multicasts information about events related to orders placed by the validation module 336, where the events alter the customer's account exposure, buying power or another limit used by the order validation module 336. The trading event updates enable the validation modules 336 to recalculate parameters, such as account exposure or buying power, intraday.

Optionally or alternatively, each order validation module 336 may send its trading event updates to a central node, such as the sponsored access manager server 333, and the central node may relay the information to all the other order validation modules 336.

Heterogeneous Arrangements

Figure 4:
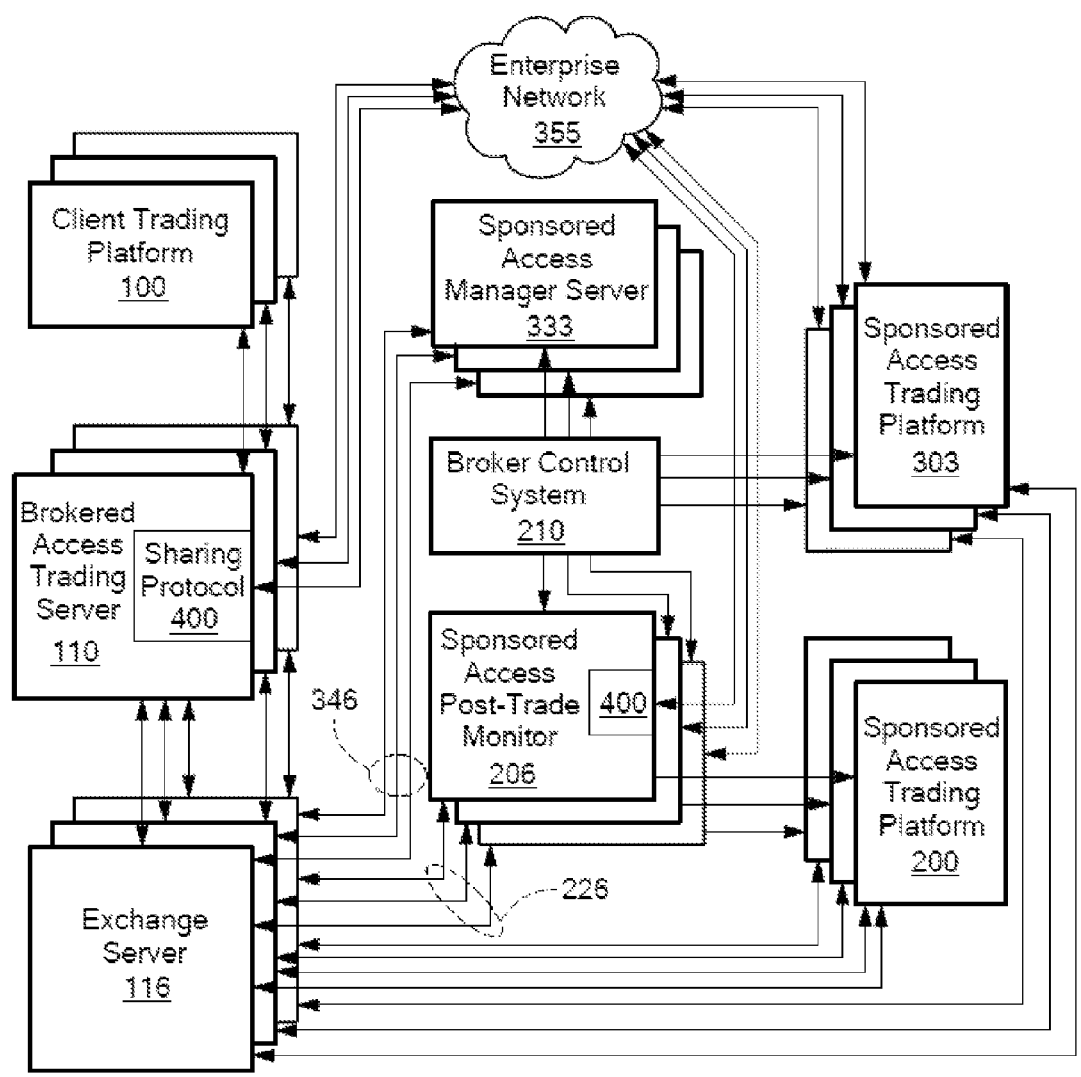
FIG. 4 is a schematic block diagram of an information sharing arrangement among two or more of the pre-trade validated brokered access securities trading system of FIG. 1, the non-intrusive, post-trade validated sponsored access securities trading system of FIG. 2 and the pre-trade validated sponsored access securities trading system of FIG. 3, according to yet another embodiment of the present invention.

Some brokers may wish to offer sponsored access arrangements that include a combination of validation methods, such as one or more of the arrangements described above, with respect to FIGS. 1, 2 and/or 3. Optionally or alternatively, some brokers or customers may wish to utilize plural servers for performance or co-location reasons. An information sharing arrangement, similar to the one described above, may be used to support such heterogeneous needs, as shown schematically in FIG. 4. Each of several client trading platforms 100 may be connected to one of several brokered access trading servers 110 to provide pre-trade validated trading, as described above with respect to FIG. 1. However, each brokered access trading server 110 may be modified to include a sharing protocol module 400 to enable the brokered access trading server 110 to send and receive trading event updates via a communication network 355. In addition, each brokered access trading server 110 may be modified to recalculate trading limits, based on trading events that are related to other trading platforms. Each of the brokered access trading servers 110 may be connected to one or more exchange servers 116, as discussed above.

Each of several sponsored access trading platforms 200 may be connected to one of several sponsored access post-trade monitors 206, as described above with respect to FIG. 2. However, each sponsored access post-trade monitor 206 may be modified to include a sharing protocol module 400 to enable the sponsored access post-trade monitor 206 to send and receive trading event updates via the communication network 355. In addition, each sponsored access post-trade monitor 206 may be modified to recalculate trading limits, based on trading events that are related to other trading platforms.

Each of several sponsored access trading platforms 303 may be connected to a broker control system 210, as described above with respect to FIG. 3. As noted, the sponsored access trading platforms 303 may include sharing protocol modules that send and receive trading event updates via the communication network 355.

Thus, the interconnected brokered access trading servers 110, sponsored access post-trade monitors 206 and sponsored access trading platforms 303 essentially share trading limits per customer and update each other with information about trading events that may impact the shared trading limits. Each brokered access trading server 110, sponsored access post-trade monitor 206 and sponsored access trading platform 303 may use the information it receives to recalculate the trading limits.

It should be noted that each brokered access trading server 110, each sponsored access post-trade monitor 206 and each sponsored access manager server 333 may handle more than one sponsored client trading platform 100 or sponsored access trading platform 200 or 303, as appropriate.

Low-Latency Communication Interface

As noted, to quickly process orders and to keep latency low, customer servers and brokerage servers typically include high-performance computer hardware, and sometimes customer servers are co-located with brokerage servers. Nevertheless, communication between customer application programs executed by customer servers, on the one hand, and order validation and order routing software executed by brokerage servers, on the other hand, is often slower than desired.

Embodiments of the present invention provide highly optimized, low-latency communication methods and facilities between customer application programs and order validation and order routing software. Trading orders can, therefore, be delivered from the customer application programs to the order validation and order routing application programs quickly. In addition, status information may be quickly returned by the order validation and order routing application programs to the customer application programs.

Figure 5:
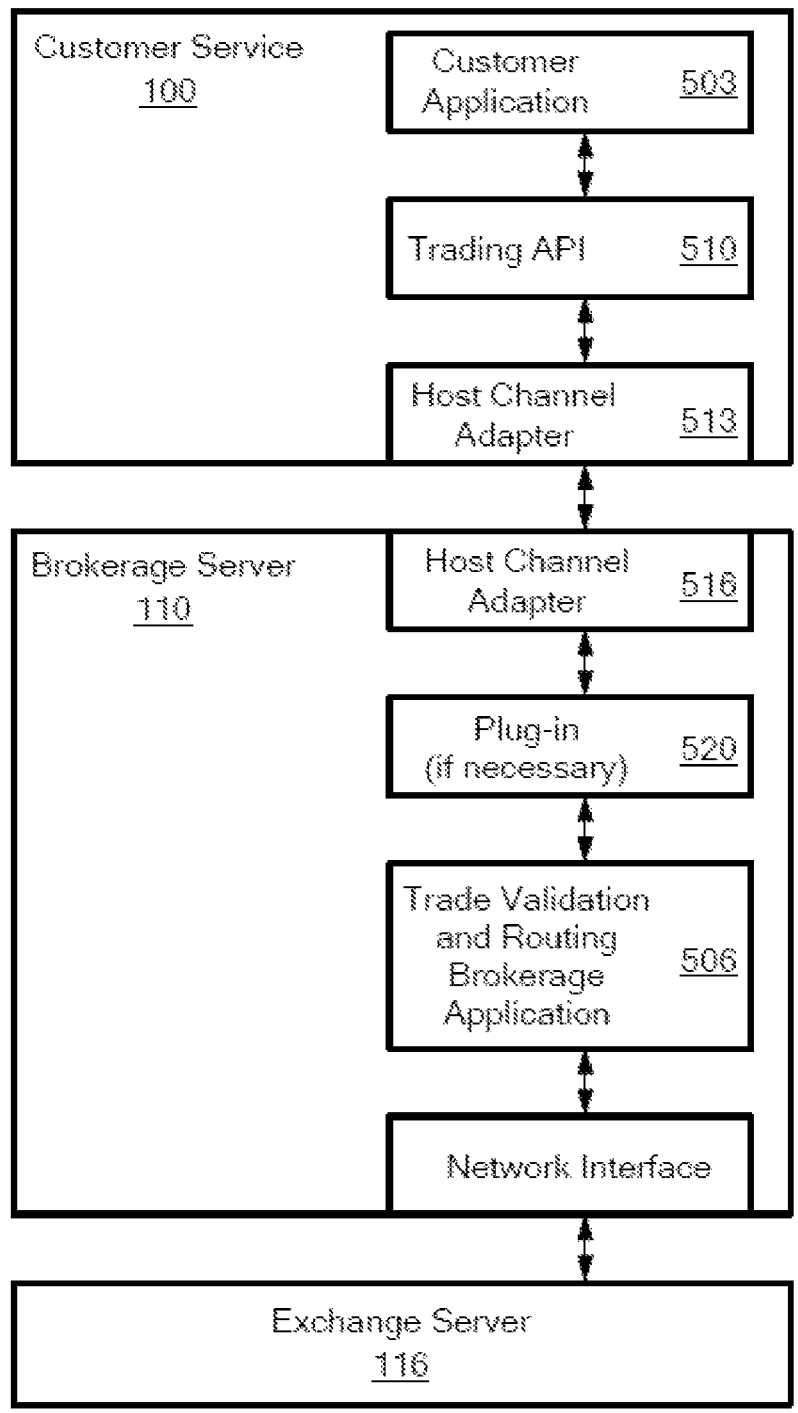
FIG. 5 is a schematic block diagram of a trading context in which embodiments of the present invention may be practiced.

FIG. 5 is a schematic block diagram of a context in which such a communication facility may be advantageously practiced. A customer server (also referred to as a "client trading platform") 100 is connected to a brokerage server (also referred to as a "brokered access trading server") 110. A customer application program 503, executed by the customer server 100, generates trading orders, and a trading validation and routing brokerage application program 506, executed by the brokerage server 110, validates the trading orders and forwards validated orders to one or more exchange servers 116, largely as discussed above.

However, the communication interface and methods utilized in this embodiment are different than in the prior art. The customer server 100 is coupled to the brokerage server 110 via a switched fabric communication facility 500, such as an InfiniBand network link. In addition, a highly-optimized, low-latency trading application programming interface (API) 510 provides an interface between the customer application program 503 and the brokerage application program 506. The API 510 supports a set of trading calls that may be issued by the customer application program 503. The API 510 formats trading orders from the application program 503 into commands (messages) of a dedicated trading command set. The API 510 uses a specifically designed protocol and drives a host channel adapter 513 to direct the formatted trading commands (messages), via the switched fabric link 500, to the brokerage application program 506. The brokerage application program 506 then processes the received commands. The API 510 avoids protocol processing by either an operating system of the customer server 100 or an operating system of the brokerage server 110.

The brokerage server 110 includes a second host channel adapter 516 to terminate the switched fabric communication link 500. If necessary, the brokerage server 110 executes a plug-in to translate messages received by the host channel adapter 516 into a format used by the brokerage application program 506, as explained in more detail below.

The API 510 supports a trading call set specifically designed for orders from customer trading application programs. Table 1 lists an exemplary set of trading calls. As shown, the number of calls is small, and all the calls are specific to trading.

TABLE 1

Exemplary API Trading Calls

| | |
|---|---|
| Place Order | Place an order for a specific symbol |
| Cancel Order | Cancel a specific previously placed order |
| Cancel/Replace Order | Cancel a specific previously placed order and replace it |
| Cancel All Open Orders | Cancel all open orders |

The "Place Order" call may accept several required parameters, examples of which are listed in Table 2. The customer application program specifies an "Order ID," so the API 510 may later provide status information and use the Order ID to associate the provided status information with the placed order. In addition, the Order ID can be used later to cancel a specific order or cancel a specific order and replace the canceled order with another order. The Order ID should be unique for a given account throughout a trading day.

TABLE 2

Exemplary Parameters to Place Order API Call

| | |
|---|---|
| Order ID | Unique ID for all orders throughout day |
| Symbol | Security/commodity to be bought or sold |
| Quantity | Number of units (shares, etc.) to be bought or sold |
| Price | Scaled price at which to buy or sell (or zero for market price) |
| Side | (See Table 3 for possible values) |

The "Price" may be specified as a scaled value, i.e., the dollar value of the order may be obtained by dividing the "Price" parameter by a predefined constant price scaling factor, such as 10,000. Scaling the price in this manner facilitates using an integer to store the "Price" parameter, thereby maintaining precision, while allowing for fractional-dollar prices. The price scaling factor may be selectable, as described below. The API 510 may assume a limit order is being placed when a non-zero price is specified. A price of zero may be used to specify a market order. A type of order may be specified by the "Side" parameter, exemplary values of which are listed in Table 3. Terms used in Table 3, Table 4, Table 5, Table 6 and Table 8 have common well-known meanings.

TABLE 3

Exemplary "Side" Values (Order Types)

Buy
Sell
Sell Short
Sell Short Exempt
Buy to Cover

Optionally, an Order or a Cancel/Replace Order call may accept one or more properties, examples of which are listed in Table 4 and Table 5.

TABLE 4

Exemplary Time In Force (TIF) Values

| | |
|---|---|
| Day | Good throughout day; automatically cancelled at end of day (default) |
| OPG | Executed at next day's opening |
| IOC | Immediate or cancel; any part unfilled immediately is cancelled |
| Extended Day | Applies to extended trading, beyond closing |
| Good Till Date | Order good until a specified date |
| At The Close | Similar to OPG, but at close |
| Time In Market | Order good for a specified length of time |

TABLE 5

Exemplary Peg Values
(Applies only to limit orders)

None
Primary
Market
Midpoint

Optionally, an Order or a Cancel/Replace Order call may accept one or more flags, examples of which are listed in Table 6. Routing, as is well known, refers to sending an order to a specified market or forwarding the order from that market to another market, such as when the requested symbol is available at a better price in the other market. Optionally, an Order or a Cancel/Replace Order call may include a route.

TABLE 6

Exemplary Flags

Allow Routing
Invisible
Post Only
ISO
NASDAQ Post Only

The "Cancel Order" call requires only an Order ID parameter. The "Cancel/Replace Order" call requires an Order ID of the order that is to be canceled, as well as an Order ID for the replacement order, a new price and a new quantity. The symbol is assumed to remain unchanged. The "Cancel All Open Orders" takes no parameters. If an order has been partially filled, the cancel request is effective for the unfilled portion of the order.

The other calls listed in Table 1 may accept parameters, flags, etc. similar to the parameters, flags, etc. discussed above, with respect to the Place Order call.

Figure 6:
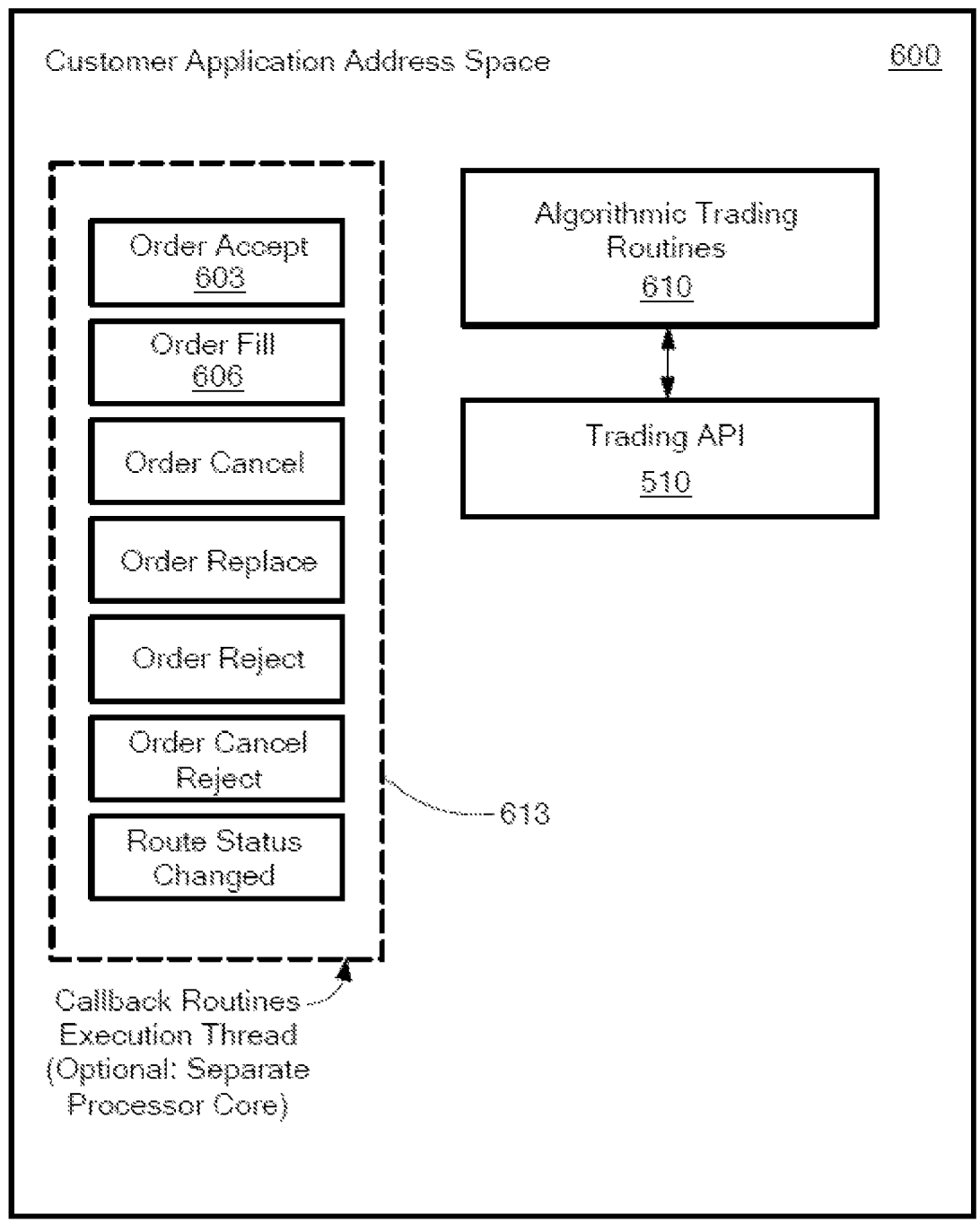
FIG. 6 is a schematic block diagram of a customer application showing an application programming interface (API) and callback routines, according to an embodiment of the present invention.

As shown schematically in FIG. 6, to facilitate providing status information back to the customer application program 503, several required and optional callback routines may be defined in the address space 600 of the customer application program 503. For example, when an order has been accepted by the exchange server 116 (FIG. 5), an "Order Accept" callback routine 603 may be called. The customer may provide the Order Accept callback routine 603 and may therein perform whatever processing the customer deems necessary or advisable. Similarly, when an order has been filled, an "Order Filled" callback routine 606 may be called. If an order is rejected, an "Order Rejected" callback routine may be called. Other callback routines may include "Order Canceled," "Order Replaced," "Order Cancel Rejected" and "Route Status Changed." A routing status may change if, for example, a TCP connection to an exchange server fails.

To streamline processing within the customer application 503, the callback routines may be called asynchronously. That is, algorithmic trading routines 610 within the customer application 503 may issue a series of API calls, such as to place, cancel and/or replace orders, within one thread of execution, and the callback routines may be executed in a separate thread of execution, or each callback routine may be executed in its own thread of execution. Optionally, the callback routines may be executed by a different (and optionally dedicated) core within a multi-core processor or by a different (and optionally dedicated) processor of a multi-processor system. An exemplary separate execution thread or separate core or processor is indicated in FIG. 6 by a dashed box 613. The threading model, including whether a dedicated core or processor is used, may be specified, such as via a parameter, when the API is instantiated or via a compile-time parameter.

In addition, calls to the API 510 are non-blocking. That is, when an API call is made, the API 510 constructs and queues a message to be sent to the brokerage application 506, and then the API 510 returns control to the customer application 503.

It should be noted that each API call is likely to precipitate more than one callback routine invocation. For example, a Place Order API call is likely to precipitate an Order Accept callback, as well as possibly several Order Fill callbacks, if the order is filled in several portions.

As noted, whenever a callback routine (except Route Status Changed) is invoked, an Order ID is passed to the callback routine to identify the order that precipitated the callback routine's invocation. In addition, whenever a callback routine is invoked, an "Event ID" may be passed. The Event ID uniquely identifies the event that precipitated the invocation of the callback routine. Event IDs may be used by the customer application program 503 to retrieve old messages, such as after a connection (route) to an exchange server 116 has been restored.

When the Order Filled callback routine is called, order fill information is also passed. The order fill information may include: a symbol of the security or commodity of the filled order; a number of shares that were filled; a scaled price at which the order was filled; a number of shares remaining to be filled from the order; and a Market Liquidity Value associated with the order according to the market setting of the order at execution. In addition, the Order Filled callback routine may be passed a remaining aggregated buying power of a group of accounts.

When the Order Replaced callback routine is called, the Order ID of the replacement order is also passed. When the Order Rejected or the Order Cancel Rejected callback routine is called, a reason code may be passed. When the Route Status Changed callback routine is called, a string containing an identification of the route and a Boolean flag indicating whether the route is connected or not may be passed.

Returning to FIG. 5, in response to calls to the API 510, the API generates and formats commands (messages) and sends the messages, via the switched fabric communication facility link 500, to the trading validation and routing brokerage application program 506. The API 510 also receives messages from the trading validation and routing brokerage application program 506 and causes the appropriate callback routine(s) to be invoked. In addition, the API 510 sends and receives other messages, such as heartbeat messages, that are unrelated to specific API calls, but that are used to maintain communication with the trading validation and routing brokerage application program 506, such as if no order-related messages have been sent for a predetermined amount of time, such as about five seconds. Thus, the API 510 employs a specialized trading communication protocol with the brokerage application program 506.

To minimize latency, message sizes are minimized. Several protocol features contribute to minimizing message size. For example, each message includes a small header (not shown in FIG. 7) that identifies the type of message being sent. In some embodiments, the header is one byte in size. Table 7 lists exemplary message types.

TABLE 7

| Exemplary Message Types |
| --- |
| Session Messages |
| Login |
| Heartbeat |
| SequenceReset |
| Logout |
| LoginAccept |
| LoginReject |
| ClientSessionMax |
| Trading Messages |
| NewOrder |
| Cancel |
| CancelReplace |
| CancelAll |
| Callback Messages |
| Accept |
| CancelAck |
| ReplaceAck |
| OrderReject |
| CancelReject |
| Fill |

When an API 510 is instantiated, such as by a constructor routine (using object-oriented and C++ terminology), the API may automatically send a Login message to the brokerage server 110 to establish a session. The Login message includes credentials, such as a user identification and a trading account identification. As a result of the Login message, the user/trading account pair is associated with the resulting session. The Logout message may be sent explicitly or, more typically, automatically as a result of closing the instance of the API 510. The Logout message may be sent by a destructor associated with the API.

Login requests may be accepted or rejected, such as because the proffered credentials are invalid or a maximum number of sessions already exists. As noted, Heartbeat messages may be sent between the brokerage server 110 and the trading API 510, if no other message has been sent for a predetermined amount of time, to enable the API 510 to detect a failure in the communication facility 500 or in either host channel adapter 513 or 516.

The brokerage server 110 may communicate with the exchange server 116 using a protocol, such as the Financial Information Exchange ("FIX"), and generate or receive monotonically increasing sequence numbers associated with transactions with the exchange server 116. In addition, the customer application 503 and the trade validation and routing application 506 each maintains a monotonically increasing Event ID associated with orders, etc. Although the Event IDs need not be communicated over the communication facility 500 (to help keep message sizes minimum), the Event IDs should be kept synchronized between the customer application 503 and the trade validation and routing application 506. If a session between the customer application 503 and the brokerage server 110 needs to be restarted, the trade validation and routing application 506 may notify the customer application 503 of the next Event ID that should be used via the SequenceReset message.

The Trading Messages, such as NewOrder, are generated by the API 510 in response to API trading calls, described above with reference to Table 1, made by the customer application 503. The Callback messages are received by the API 510 from the brokerage server 110 in response to various events, as described above, and, in turn, the API 510 invokes the appropriate callback routines.

Figure 7:
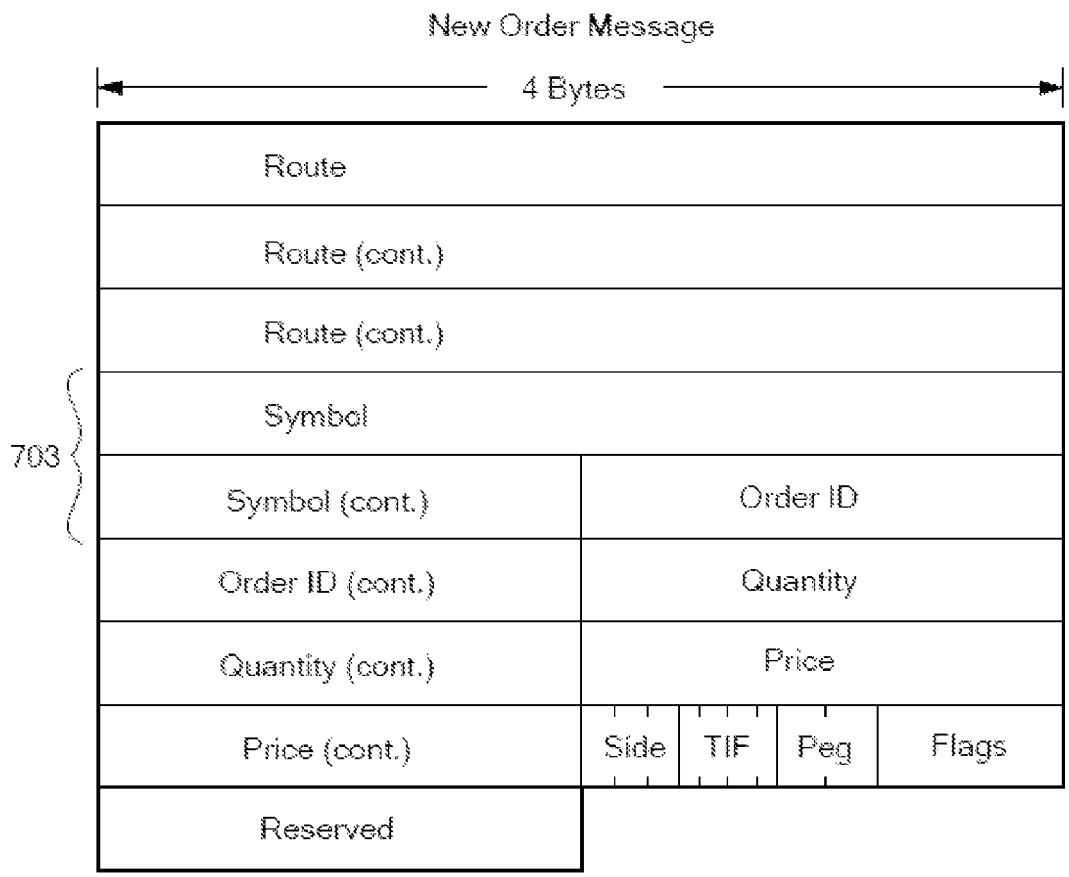
FIG. 7 is a schematic block diagram of a New Order Message, according to an embodiment of the present invention.

FIG. 7 is a schematic block diagram of an exemplary basic "New Order" message generated by the API 510, as a result of a Place Order call. As a further example of how message sizes are kept to a minimum, numeric data is sent in a binary format, rather than as character strings. (This is referred to as a "binary protocol.") For example, the Order ID, Quantity and Price fields shown in FIG. 7 are binary fields, unlike in some conventional financial protocols, such as FIX protocol, where character strings are used.

Figure 8:
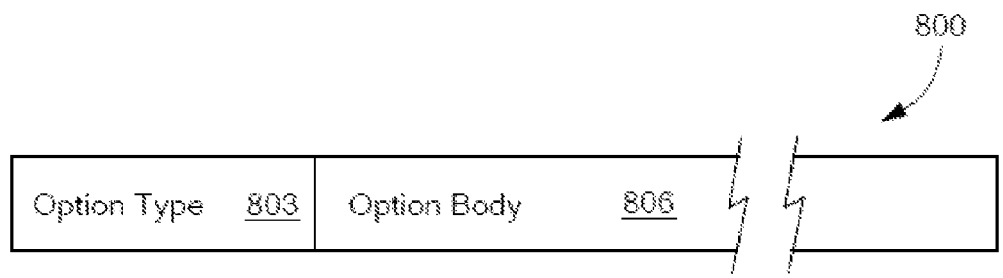
FIG. 8 is a schematic block diagram of an option field, which may be added to the New Order Message of FIG. 7, according to an embodiment of the present invention.

In addition, character strings are sent in small, fix-length fields, with an option to use additional fields, if necessary to send long strings. Thus, when necessary, one or more option fields may be appended to the basic message. A prototypical option 800 is shown schematically in FIG. 8. The option 800 includes an Option Type field 803, which contains a code that identifies the type data contained in an Option Body field 806. The Option Body field 806 may be fixed length, where the length is implied by the code in the Option Type field 803. Optionally or alternatively, the Option Body field 806 may be variable length. Variable length Option Body fields may begin with a byte count, or they may be terminated with a null byte.

Returning to FIG. 7, some parameters, such as Symbol, are typically relatively short. For example, most symbols contain less than about six characters. However, some infrequently used symbols, such as symbols for options, may be considerably longer. To minimize the length of most New Order messages, a short fixed-length field is used for the Symbol field 703. However, if an order involves a symbol whose length exceeds the length of the fixed-length Symbol field 703, the API 510 appends a "Large Symbol" option to the New Order message. The Large Symbol option may be a fixed-length option sufficiently long to contain the longest possible symbol, or the option may be a variable-length option, as discussed above. Other exemplary options are listed in Table 8.

TABLE 8

| Exemplary Options |
| --- |
| Time in Market |
| Expire Time |
| Peg Difference |
| Maximum Floor |
| Minimum Quantity |

As noted, in response to other API calls from the customer application 503 (FIG. 5), the API 510 generates and formats other messages to the brokerage application 506. These messages collectively form commands of a dedicated trading command set to the brokerage application 506. In the illustrated embodiment, the messages are transported over the switched fabric communication facility 500 by the host channel adapters 513 and 516.

The host channel adapter hardware 513 and 516, such as InfiniBand hardware, may be used to perform some protocol processing and related function, thereby offloading processors that execute operating system software or application-level software, such as the customer application 503. In some embodiments, transmit and receive buffers are allocated in memory on both the customer server 100 and the brokerage server 110, and the host channel adapters 513 and 516 cooperate to transfer data between portions ("slots") of the buffers to effect communication between the two servers 100 and 110. InfiniBand and other host channel adapter hardware often provide two communication paradigms, namely remote direct memory access or "RDMA" and send/receive. In the send/receive paradigm, a source issues a Send that describes a location of data to be sent, a destination posts a Receive that similarly indicates where the data is to be written, and a matching capability is used to associate a posted Receive to an incoming Send. Embodiments of the present invention may use either paradigm; however, the send/receive paradigm is preferred.

Figure 9:
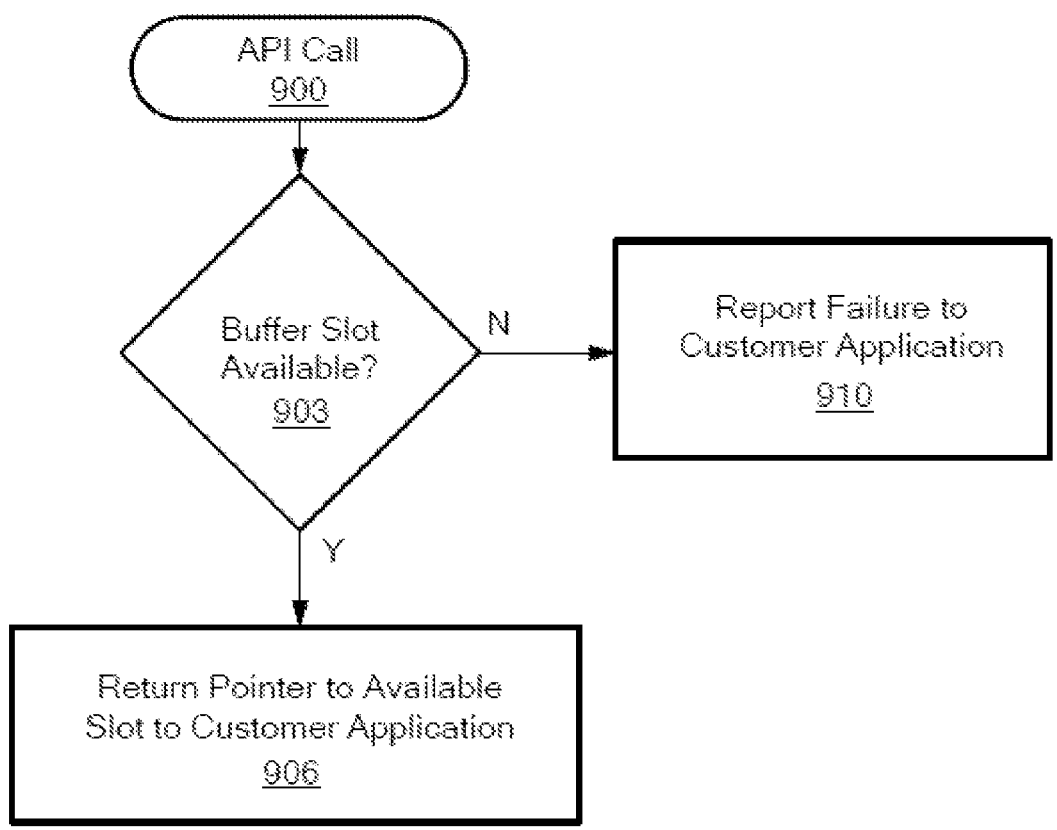
FIG. 9 is a flowchart of message flow control, according to an embodiment of the present invention.

The API 510 provides a thin interface between the user application 503 and the host channel adapter 513. This interface manages the buffer space and, based on availability of slots, either allows or prevents the customer application 503 to send messages. This process is collectively referred to as flow control and is illustrated in a flowchart in FIG. 9.

Some embodiments use network interface cards (NICs) and Ethernet or other network connections instead of host channel adapters and switched fabric connections, such as InfiniBand connections. These embodiments may not benefit from all the host processor and operating system offloading or bypass described above. However, some users may prefer to use Ethernet connections, such as to due to the lower cost of Ethernet hardware or to avoid distance constraints associated with InfiniBand connections. Other users may prefer to use Ethernet connections, at least during a transition period, as part of a phased implementation strategy in which some portions of the disclosed high-performance trade data interface are implemented before other portions of the interface are implemented. Even without the use of host channel adapters and switched fabric connections, the disclosed binary protocol may be used over Ethernet or other conventional network connections, and the advantages associated with the binary protocol may be realized.

As the API 510 receives calls 900, the API checks availability of a slot 903 in the receive buffer of the brokerage server 110. If a slot is available, the API allows 906 the customer application 503 to place a message in the transmit buffer, and the message is transferred to the receive buffer of the brokerage server 110 by the host channel adapters 513 and 516. On the other hand, if no slot is available in the receive buffer of the brokerage server 110, the API reports failure 910 to the customer application 503, and the customer application 503 may take appropriate action.

Returning to FIG. 5, because the trade validation and routing brokerage application 506 performs checks on orders, few, if any, checks need to be performed by the API 510 on the parameters passed to it by the customer application 503, thereby minimizing the amount of processing the API performs, which contributes to the low-latency characteristics of the interface. Furthermore, unlike some prior art interfaces, the API 510 is compiled, rather than relying on an interpreter or a virtual machine, such as a Java virtual machine. We have found that using a virtual machine to implement an API introduces some undesirable nondeterministic latency characteristics. Our compiled API 510 avoids these characteristics.

Some embodiments of the API 510 may be written in C++ or another appropriate object-oriented or conventional computer programming language. Furthermore, the API 510 controls the host channel adapter 513 from within the user process context of the customer application 503, thereby avoiding context switches, socket interfaces and operating system (i.e., kernel mode) protocol processing, as would be required by, for example, a conventional TCP/IP interprocess communication network connection. A compiled API 510 avoids the need for a virtual machine, its attendant separate process and the process context switching that would otherwise be required. Thus, the API 510 may be called directly by the customer application 503 to receive trading orders from the customer application 503. Being called "directly" means without requiring a context switch, as would be required if a virtual machine in a separate process were used.

Depending on the type of messages expected by the trade validation and routing brokerage application 506, and possibly on the type of messages the brokerage application 506 sends to the exchange server 116, messages received by the brokerage server 110 may be delivered to the brokerage application 506 with or without first translating the incoming messages. For example, if the brokerage application 506 expects messages according to the FIX protocol, the messages received by the host channel adapter 516 may need to be translated from a binary protocol to the FIX protocol. If so, a plug-in module 520, such as a software plug-in, may be interposed between the host channel adapter 516 and the brokerage application 506 to perform such a translation. On the other hand, if the brokerage application 506 processes message according to a binary protocol, no translation may be necessary. Furthermore, depending on the protocol required to communicate with the exchange server 116, messages from the brokerage application 506 may need to be translated before being sent to the exchange server 116. In either case, message copying within the memory of a server 100 or 110 is avoided where possible, to avoid the time (and, therefore, latency) such copying would add to a transaction.

A post-trade monitor receives feedback in the form of drop copy messages from an exchange server and validates orders placed with the exchange server by a sponsored access trading platform shortly after the orders have been placed. If a recently placed order is found to violate a rule or regulation, the monitor instructs the trading platform to change to a more restrictive trading mode, such as to cease placing all orders or certain types of orders, at least until certain parameters are met. A library provides an interface in a sponsored access trading platform between a client application program that generates proposed orders and an exchange server. The library provides pre-trade validation of the orders and sends only validated orders to the exchange server. A network enables monitors, trading platforms and libraries to share information about customers' trading activities and locally recalculate customer trading limits resulting from these trading activities.

A low-latency interface between a customer server, such as a server that employs algorithmic trading methods to generate buy and sell orders for securities, and a brokerage server that validates such securities trading orders is optimized for handling the securities trading orders. The interface supports a trading command set specifically designed for orders from customer trading application programs, and the interface formats received trading commands into compact messages that are sent over a high-speed communication link to the brokerage server. The interface receives order acknowledgement messages and the like from the brokerage server and invokes callback routines in the customer trading application program to report status information Each platform and each server described above may be implemented by a processor controlled by instructions stored in a memory. Similarly, each application program described above may be executed by a processor controlled by instructions stored in a memory. Such a processor may be a separate central processing unit (CPU), such as a microprocessor, or a core of a multi-core CPU. The memory may be random access memory (RAM), read-only memory (ROM), flash memory or any other memory, or combination thereof, suitable for storing control software or other instructions and data. Some of the functions performed by the sponsored access post-trade monitor, the sponsored access manager server, the APIs and the library have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some embodiments have been described with reference to block diagrams, those skilled in the art should readily appreciate that functions, operations, decisions, etc. of all or a portion of each block, or a combination of blocks, of a diagram may be combined, separated into separate operations or performed in other orders. Furthermore, disclosed aspects, or portions of these aspects, may be combined in ways not listed above. Accordingly, the invention should not be viewed as being limited to the disclosed embodiments.

What is claimed is:

1. A system for automatically distributing, among a plurality of trading platforms, information about a customer's trading activities on each of the trading platform, each trading platform comprising:
   a first communication interface configured to receive, via a computer network, at least one message containing information related to a trading limit for the customer;
   a second communication interface configured to communicate, via a computer network, with another at least one of the plurality of trading platforms; and
   a module configured to automatically:
      receive the information related to the trading limit for the customer;
      send, via the second communication interface, directly to another at least one of the plurality of trading platforms, information about trading events related to the customer's trading activities on the trading platform;
      receive, via the second communication interface, directly from another at least one of the plurality of trading platforms, information about trading events related to the customer's trading activities on the other at least one trading platform; and
      recalculate the trading limit, based at least in part on the received information.

2. A system according to claim 1, further comprising a broker control system coupled via the computer network to the first communication interface of at least one of the plurality of trading platforms and configured to send the at least one message containing information related to the trading limit for the customer.

3. A system according to claim 2, wherein the broker control system is coupled to at least one post-trade monitor server and configured to send information related to the trading limit for the customer to each of the at least one post-trade monitor server.

4. A system according to claim 1, wherein the module is further configured to:
   automatically determine if the recalculated trading limit is exceeded; and
   if the recalculated trading limit is exceeded, perform at least one of the following operations:
      change to a less permissive trading mode;
      prevent an order being placed with at least one exchange server; and
      enter a trading mode in which orders that decrease account exposure are allowed and orders that increase account exposure are prevented.

5. A method for automatically distributing, among a plurality of trading platforms, information about a customer's trading activities on each of the trading platforms, the method comprising, on each trading platform:
   receiving, via a computer network, at least one message containing information related to a trading limit for the customer;
   sending, via a computer network, directly to another at least one of the plurality of trading platforms, information about trading events related to the customer's trading activities on the trading platform;
   receiving, via a computer network, directly from another at least one of the plurality of trading platforms, information about trading events related to the customer's trading activities on the other at least one trading platform; and
   recalculating the trading limit, based at least in part on the received information.

6. A method according to claim 5, further comprising sending the at least one message containing the information related to the trading limit for the customer.

* * * * *